July 13, 1937.  O. E. ANDRUS  2,087,136
WATER PURIFIER
Filed Nov. 24, 1936   2 Sheets-Sheet 1
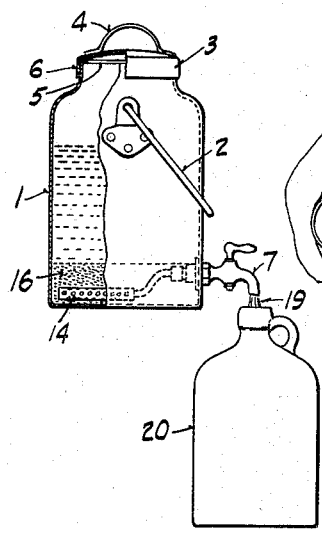
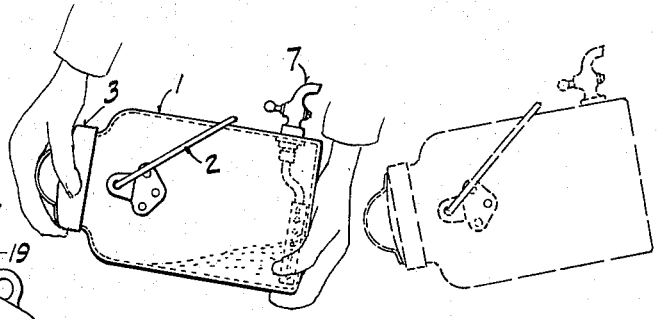
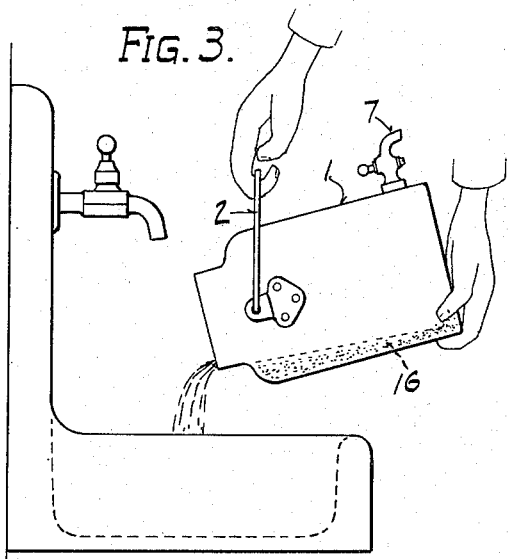
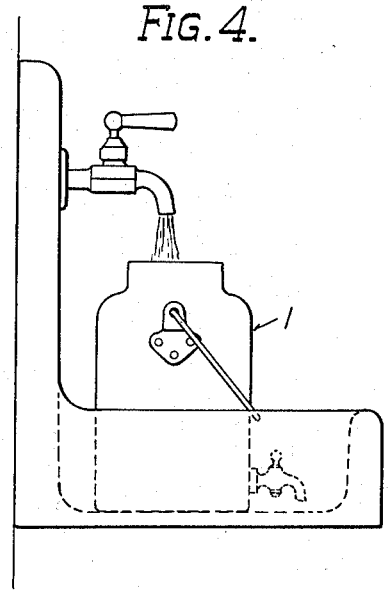
INVENTOR.
Orrin E. Andrus
BY
ATTORNEY.

July 13, 1937.      O. E. ANDRUS      2,087,136
WATER PURIFIER
Filed Nov. 24, 1936      2 Sheets-Sheet 2

INVENTOR.
Orrin E. Andrus
BY
ATTORNEY.

Patented July 13, 1937

2,087,136

UNITED STATES PATENT OFFICE 2,087,136

WATER PURIFIER

Orrin E. Andrus, Milwaukee, Wis.

Application November 24, 1936, Serial No. 112,555

14 Claims. (Cl. 210—99)

This invention relates to a combination sterilizer and purifier for drinking water adapted particularly for home, camp, restaurant or office use.

The object of the invention is to provide a method and an apparatus for sterilizing and purifying batches of water to kill all water-born pathogenic organisms, to cleanse the water of undesirable impurities and dead organisms and to improve the palatableness of the water. The drinking water in many towns and rural districts is subject to contamination at times, making it advisable to sterilize and purify it. The customary way of sterilizing water by boiling does not remove objectionable impurities frequently found in contaminated water. The apparatus and method of the present invention make it possible for even a small child to readily convert most any natural water, having a high contamination of impurities and dangerous organisms, into a sterile, clear, colorless, odorless and palatable drinking water. Although it will not remove large quantities of soluble impurities, it will remove most tastes, colors and odors which may be found in natural waters.

Another object is to provide a method and apparatus which eliminate the objectionable taste and turbidity so often encountered when water is sterilized by boiling. It has long been the practice to boil drinking water for babies and children. Seldom does this boiled water appear or taste appetizing even to adults because of changes produced by boiling such as the precipitation of calcium carbonate or other salts. Children in general, being more discriminating than adults, are apt to limit their water consumption below normal requirements because of this change. With the present invention, it is readily possible to rectify changes produced by boiling and thereby to make the water more appetizing without in any way lessening the sterility.

The invention and its objects may be more readily understood by reference to the accompanying drawings, in which:

Figure 1 is a view partly in section of an embodiment of the invention showing it in the filtering position;

Fig. 2 is a view of the apparatus of Fig. 1 showing the container and filter bed being scoured and washed by agitation with water;

Fig. 3 is a view of the apparatus of Fig. 1 showing the wash water along with suspended impurities being decanted from the container;

Fig. 4 is a view of the apparatus of Fig. 1 showing the container being filled with raw water preparatory to the washing or sterilizing operations;

Figure 9:
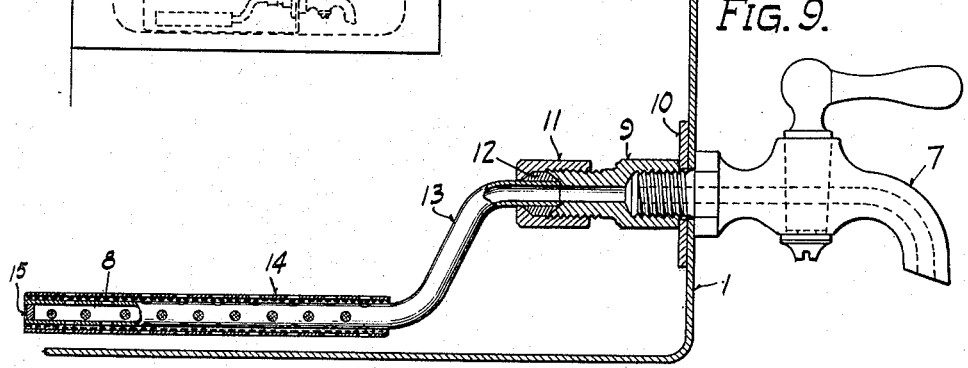
Fig. 9 is a detailed view of the screen tube assembly.
Figure 10:
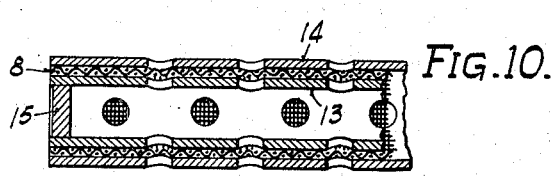
Fig. 10 is an enlarged sectional view of the end portion of the screen tube.

The preferred form of the portable apparatus generally consists of a container 1, which may be made of aluminum and conveniently of one or two gallon capacity. A bail 2 may be provided for convenience in handling the apparatus during the various operations making up a sterilizing and purifying cycle. The container cover 3 is provided with the handle 4, the rubber packing ring 5, and the apron 6. The faucet 7, external to the container, communicates with the internal screen tube 8 shown at the bottom of the container 1. The details of the faucet 7 and screen tube 8 are illustrated in Figs. 9 and 10. The faucet 7, together with the compression coupling 9 and the washer 10, makes a water-tight seal at the junction with the container 1. The nut 11, together with the metal packing sleeve 12, makes a tight connection between the tube 13 and the compression coupling 9. The concentric tubes 13 and 14 are similarly perforated. Screen tube 8 is held tightly between the tubes 13 and 14 by upsetting the latter. The plug 15 is held in place in the end of tube 13 by upsetting the latter. A loose filter bed 16, preferably of sand, covers the screen tube 8.

Assuming that the apparatus is clean, then the first operation required in the purification of a batch of water is that of filling the container 1 with the water to be sterilized and purified, as illustrated in Fig. 4.

Figure 5:
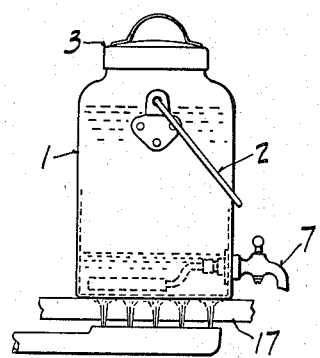
Fig. 5 is a view of the apparatus of Fig. 1 showing the container on a stove undergoing the sterilization operation.

After charging the apparatus with raw water, the container, with cover in position, is placed on a stove 17 or other source of heat, as shown in Fig. 5. In the preferred form the apparatus is constructed for the application of heat to the container directly beneath the loose filter bed so as to sterilize the entire filter bed, the entire water contacting surfaces of the container and fixtures, and the charge of raw water. It is necessary to apply the heat to the water at an elevation at or below the lowest point of the filter bed to insure adequate sterilization of the entire filter bed and the water contained therein. This invention contemplates the application of heat by electrical or other means within the container as well as heat transferred through the container walls from the exterior.

Figure 6:
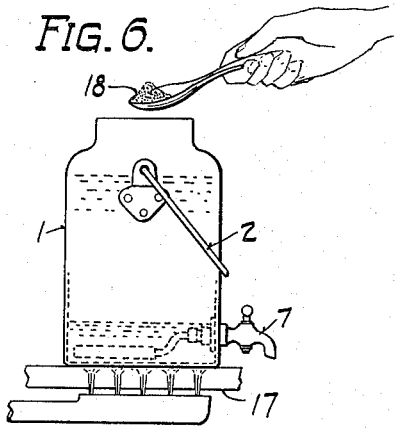
Fig. 6 is a view of the apparatus of Fig. 1 showing the operation of adding purifying materials to the boiling water.

In the preferred method of the invention, the entire batch of water is brought to a boil, the cover is removed and the purifying material 18 is introduced by a spoon to the boiling water as shown in Fig. 6. Adsorbing material suitable for use in this apparatus may be made by agitating the water with aluminum sulphate and sodium bicarbonate in a ratio to insure the complete conversion of the aluminum sulphate to aluminum hydroxide. These chemicals react to produce an insoluble coagulating and adsorbing material which is effective in removing impurities. Another adsorbing material found suitable is charcoal. Usually it is desirable to introduce all three of the above-mentioned substances to accomplish adequate adsorption and removal of impurities. It is convenient to thoroughly mix the aluminum sulphate, sodium bicarbonate and powdered charcoal in a very dry state in the desired proportions and to store this mixture in an air-tight-moisture-proof container. Each time a batch of water is boiled for purification, a small amount of this mixture is then removed from this moisture-proof container and introduced into the water. The use of such a mixture simplifies the operation of the purifier and insures correct proportions of the chemicals. It is within the scope of this invention to add soluble or insoluble materials to the water to form an insoluble adsorbing medium. The materials which may be used include among others:—alum, sodium aluminate, sodium carbonate, caustic soda, calcium oxide, calcium hydroxide, activated carbon, clay, silica gel and disseminated cellulose. It is also within the scope of this invention to sterilize and purify without the aid of adsorbing agents.

The introduction of adsorbing material into the boiling water has been found to possess several advantages including the following: The boiling water adequately disperses this material and contacts the entire batch of water with the material without the necessity of manual agitation. The application of a coagulating adsorptive material to the boiling water aids the removal of precipitated calcium salts. The boiling water sterilizes the adsorbing chemicals. The boiling action serves to spread the loose filter bed evenly over the bottom of the apparatus, assuring adequate covering of the screen tube for the filtering operation. The solid adsorbing agent is effectively withheld from entering the screen tube during the mixing operation, thus eliminating the need of flushing out the screen tube before withdrawing filtered water for consumption.

Introduction of adsorbing material prior to the heating operation lies within the scope of the invention. However, when this is done, some means of agitation is necessary to form and disperse soluble reacting chemicals into a suitable coagulating adsorptive material. The coagulating adsorptive material thus produced ahead of the boiling operation may fail to remove all of the precipitated calcium carbonate caused by the boiling operation.

Introduction of adsorbing material following the heating operation also lies within the scope of the invention. However, some means of mechanically agitating the water and adsorbing material must be used, such as manual shaking of the apparatus and contents. This practice lacks most of the advantages possessed by the method of introducing the adsorbing material during the boiling operation with the possible exception that it will also effectively remove precipitated calcium carbonate caused by the boiling operation.

The boiling operation is preferably continued for five or more minutes to insure adequate sterilization of the entire container, the faucet, screen, cover and every portion of the filter bed, as well as the water being treated.

Figure 7:
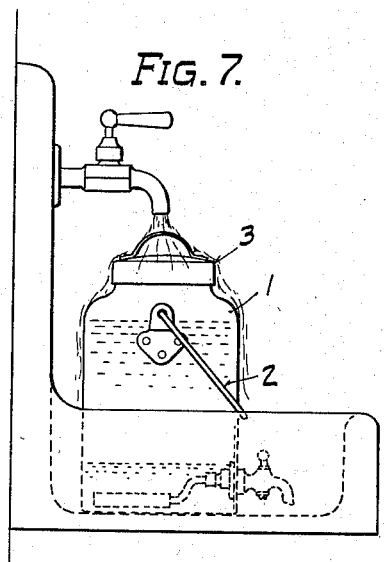
Fig. 7 is a view of the apparatus of Fig. 1 showing the container and contents being cooled by pouring water over the outer surfaces.

The apparatus and contents are usually cooled before the filtering operation is started. However, it is preferable sometimes to filter the water while it is hot, particularly if it is desired to sterilize the receptacle into which the water is drawn. The apparatus can be cooled by air over a period of time or it can be cooled quickly by partially immersing it or by flowing water over it. The latter method of flowing cold water over the apparatus, as shown in Fig. 7, is particularly rapid and convenient when slow air cooling is not permissible. Since it is very important to prevent the entrance of contaminated cooling water into the sterilized water, an apron 6 is provided surrounding the cover 3. After the major portion of the heat has been removed from the apparatus and sterilized water, this water may be filtered into receptacles and the receptacles stored in a refrigerator for use as required. It is also possible to place the entire apparatus with its contents of sterilized water into a refrigerator and to filter the cold sterile water as required.

During the filtering operation, the coagulated adsorptive material with its load of attached impurities remains on the upper filter bed surface while the sterilized and purified water passes through the filter bed 16 into the screen tube 8, and exits from the container through the cock 7. The layer of coagulated adsorptive material, which gathers on the upper surface of the filter bed, also aids in filtering out impurities. As the filtered water is withdrawn from the faucet 7, air enters the apparatus around the loose fitting cover. Fig. 1 illustrates the apparatus during the filtering operation in which the sterilized and filtered water 19 is drawn into the receptacle 20.

When all of the treated water has been filtered out, the cover is removed and the container partially filled preferably with raw water, as shown in Fig. 4. By raw water is meant water that has not been sterilized by heat. The container is preferably recovered and grasped in a horizontal position as shown in Fig. 2. The contents are violently agitated by an end-to-end motion of the apparatus to thereby suspend the coagulated or other adsorbing agent with attached impurities and to scour the inner surfaces of the container. Then the cover is removed and the water and suspended impurities decanted off, leaving the filter bed within the container, as shown in Fig. 3. The operation of washing as shown by steps in Figs. 4, 2, and 3 may be repeated several times until the decanted wash water remains relatively clean. It lies within the scope of the invention to cause a continuous stream of wash water to enter the container and to let the suspended matter overflow, leaving the filter bed within the container. The cycle is now completed and the apparatus is ready to be recharged for sterilization and purification of the next batch of water.

The sand bed or other equivalent filter medium may be used repeatedly with replenishment or renewal from time to time. It is possible, although not preferable, to sterilize and filter an indefinite number of batches of water without washing out the coagulated or other adsorbing agent with attached impurities during each cycle. This re-use of purifying chemicals can be practiced with or without the further addition of chemicals during each cycle.

Figure 8:
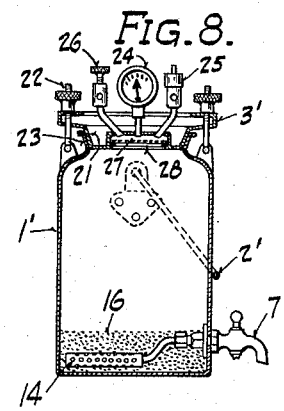
Fig. 8 is a cross section of a modified form of apparatus adapted for pressure sterilization.

A modified form of the apparatus shown in Fig. 8 is adapted for pressure sterilization in case boiling at atmospheric pressure is considered of questionable adequacy. It consists of a container 1' built to resist sterilizing pressures. A bail 2' may be provided for convenience in handling the apparatus during the various operations making up a sterilizing and purifying cycle. The container cover 3' is provided with a tapered portion 21 which tightly seals the container by means of the thumb screws 22 which draw it into close engagement with the tapered rim 23 of the container 1'. This cover may likewise be provided with an apron to guard against the leakage of cooling water between the cover and the container. A pressure gauge 24, an automatic pressure relief or safety valve 25 and a manually operated valve or petcock 26 are provided on the cover 3'. A removable screen 27 held in place by a split ring 28 serves to keep solid matter from entering the gauge and valves and thereby injuring them. The faucet 7, the screen tube assembly and the filter bed are identical to those used in the preferred form. Assuming that the pressure apparatus is clean, then the first operation required in the sterilization and purification of a batch of water is that of filling the container 1' with the water to be sterilized and purified. After charging the apparatus with raw water, the container with cover set loosely in position is placed on a stove or other source of heat. Heat is applied beneath the loose filter bed until the water comes to a boil. While continuing the boiling operation, the cover is removed and the coagulating mixture or other adsorbing material is introduced to the boiling water. Before returning the cover 3' to its position and clamping it tightly to the container 1' with thumb screws 22, the manually operated valve 26 on the cover 3' is opened. As soon as the air is driven from the container, as evidenced by the visual evolution of steam from the valve 26, this valve is closed. By regulation of the heat from the stove, the steam pressure is brought to 26 to 30 pounds absolute equivalent to 240° F. to 250° F. temperature and held there for 15 or more minutes. The pressure relief valve 25 serves to protect the apparatus should improper regulation of the heat allow the pressure to increase too high. It is understood that the sterilizing pressure and time may be varied from those given to suit the requirements. When the heating is discontinued, the valve 26 may be opened to release the steam pressure and to let in air. The cooling, filtering and washing operations are identical to those previously described. It is preferable to introduce the purifying material into boiling water, although it lies within the scope of the invention to introduce it before or after the boiling operation.

Following are specific definitions of some of the terms used in the claims:—"Sterilizing" in conjunction with container refers to a container adapted for simultaneous sterilization by heat of all water contacting surfaces of the apparatus as well as the entire batch of water held in said container. "Single chambered" in conjunction with container refers to a container of such construction that the loose filter bed can essentially contact all water contacting surfaces within said container with the exception of the surfaces beyond the screen tube or its equivalent. "Loose" in conjunction with filter bed refers to a filter bed made up of particles which are sufficiently unconfined as to allow sufficient movement between the particles when they are agitated in the presence of water to remove adsorbing agents and impurities from the filter bed and also to simultaneously produce a scouring action on the screen and water contacting surfaces of the apparatus. "Filter bed" refers to a filtering medium adapted for the filtration of the batch of sterilized water as this water is withdrawn from the sterilizing container. "Submerged" in conjunction with filter bed refers to a filter bed submerged in the batch of water during the sterilizing operation. "Means for applying heat" or "means for the application of a sterilizing heat" in conjunction with water refer either to a surface of the container from which the water receives heat or to an internal heater. When "outlets", "inlets" or other openings are referred to in the claims, it is intended that, where otherwise not stated, one opening may serve as both inlet and outlet. Thus the covered opening of Figs. 1 to 7 serves as an inlet for the introduction of a batch of water to be sterilized, as an opening for the introduction of adsorbing material, as an inlet for air when the apparatus is filtering, as an inlet for the introduction of wash water, and as an outlet for decanting the wash water. It is also possible to convert a single opening into more than one opening or vice versa during the various operations of a cycle by the use of a suitable adapter, as a cover with two openings such as the cover of Fig. 9. The terms "decanting" or "decantation" refer to the process of removing a batch of wash water and suspended matter by tilting the container sufficient to pour off the wash water.

Various embodiments of the invention may be employed within the scope of the accompanying claims, and certain of the features claimed may be employed in stationary, non-portable apparatus without departing from the scope of the invention.

The invention is claimed as follows:

1. An apparatus for sterilizing and purifying water in batches comprising a sterilizing container, a loose finely divided filter bed therein adapted to be submerged in the batch of water, said container having an inlet for the introduction of a batch of water to be sterilized and purified, and means for applying heat to the water at an elevation below the submerged filter bed to sterilize the same, said container having an outlet for conducting the sterilized and filtered water to the exterior of said container during the filtering operation and means in connection with said outlet to prevent the escape of the filter bed material with the filtered water, an inlet for air to enter the container when said apparatus is positioned for filtering, an inlet for the introduction of wash water, and an outlet from which to flush the wash water with suspended impurities from the container.

2. An apparatus for sterilizing and purifying water in batches comprising a sterilizing container, a loose finely divided filter bed therein adapted to be submerged in the batch of water, said container having an inlet for the introduction of a batch of water to be sterilized and purified, means for applying heat to the water at an elevation below the submerged filter bed to sterilize the same, said container having an opening through which purifying chemicals may be introduced and extending above the water level of the container when said container is positioned for sterilization, a removable cover for said opening and having means to prevent the entrance of cooling water into the container during the cooling operation, said container having an outlet for conducting sterilized and filtered water from said filter bed to the exterior of said container, a screen in connection with said outlet with openings which prevent the escape of the filter bed material with the water conducted from said outlet, and means for the entrance of air to the space above the water in said container when said apparatus is positioned for filtering, said container having an inlet for the introduction of a batch of wash water and an outlet during the washing operation for the decantation of wash water with suspended adsorbing material and impurities from the container, and being manually movable for washing and decanting wash water.

3. An apparatus for sterilizing and purifying water in batches comprising a steam pressure-retaining sterilizing container, a loose finely divided filter bed therein adapted to be submerged in the batch of water, said container having an inlet for the introduction of a batch of water to be sterilized and purified, means for applying heat to the water at an elevation below the submerged filter bed to sterilize the same, an automatic pressure relief valve, an air release valve connecting with the steam space, said container having an opening above the water level therein when the container is in heating position and a steam-tight cover for said opening, an outlet with a valve for conducting the sterilized and filtered water to the exterior of said container and means in connection with said outlet to prevent the escape of the filter bed material with the filtered water, means for the entrance of air to the space above the water in said container when said apparatus is positioned for filtering, an inlet for the introduction of wash water, and an outlet from which to flush the water wash with suspended impurities from the container.

4. An apparatus for use in sterilizing and purifying water in small batches for drinking purposes comprising a single chambered sterilizing container having therein a loose granular filter bed adapted to be submerged in the batch of water, and having an inlet for the introduction of a batch of water to be sterilized and purified, and means for the application of a sterilizing heat to the batch of water by transference of said heat through said submerged filter bed in the form of convection currents of hot water and steam, said container having an opening through which purifying chemicals may be introduced, said opening being above the water level of the container when said container is positioned for sterilization, means for closing said opening, an outlet for conducting sterilized and filtered water from said filter bed to the exterior of said container, a screen in connection with said outlet with openings which prevent the escape of the filter bed material with the water conducted from said outlet, an inlet for air to enter the container when said apparatus is positioned for filtering, an inlet for the introduction of a batch of wash water, and an outlet during the washing operation for the decantation of wash water with suspended adsorbing material and impurities from the container, said container being adapted for manual shaking when containing wash water and adapted for manual tilting when decanting wash water from the filter bed.

5. An apparatus for use in sterilizing and purifying water in small batches for drinking purposes comprising a single chambered sterilizing container, a loose granular filter bed therein, a surface of the container being adapted for the application of the heat to the container and contents and so positioned as to be covered by said filter bed when in the heating position, said container having an opening above the water level when the container is in the heating position and provided with a closure, a faucet on the exterior of said container, a screen having openings smaller than the filter bed granules and preceding the entrance to the faucet, said screen being positioned so as to lie beneath the surface of the filter bed during the period of filtration, and means for the entrance of air to the space above the water in said container when said apparatus is positioned for filtering, said container and contents being adaptable for manual shaking and tilting.

6. The method of sterilizing and purifying water in batches comprising disposing the batch of water to be sterilized and purified into a sterilizing container having therein a loose finely divided filter bed, applying heat to the batch of water at an elevation below the lowest point of the filter bed to sterilize the entire batch of water, the entire filter bed and all apparatus surfaces with which said water may contact, filtering the sterilized water through said sterile filter bed as it leaves the sterilizing container to remove salts precipitated by the boiling operation and other solid matter, adding water for washing purposes, agitating said filter bed and wash water within said apparatus to suspend previously precipitated salts and impurities, and flushing out suspended matter from the container without removing the loose finely divided filter bed.

7. The method of sterilizing and purifying water in batches comprising disposing the batch of water to be sterilized and purified in a sterilizing container having therein a loose finely divided filter bed, applying heat to the batch of water at an elevation below the lowest point of the filter bed to sterilize the entire batch of water, the entire filter bed and all apparatus surfaces with which said water may contact, introducing adsorbing material, dispersing the material throughout the batch of water in said container at any time following the introduction of the batch of water into said container to aid in the removal of impurities, filtering the sterilized and treated water through said sterile filter bed as it leaves the sterilizing container to remove insoluble adsorbing material and attached impurities, adding water for washing purposes, agitating said filter bed and wash water within said apparatus to suspend previously deposited impurities and solid adsorbing material, and flushing out suspended matter from the container without removing the loose finely divided filter bed.

8. The method of sterilizing and purifying water in batches comprising disposing the batch of water to be sterilized and purified in a pressure-retaining sterilizing container having therein a loose finely divided filter bed, applying heat to the batch of water at an elevation preferably below the lowest point of the filter bed to remove air from the container and to produce a steam pressure which promotes proper sterilization of the entire batch of water, the entire filter bed and all apparatus surfaces with which said water may contact, filtering the sterilized water through said sterile filter bed as it leaves the sterilizing container to remove salts precipitated by the boiling operation and other solid matter, adding water for washing purposes, agitating said filter bed and wash water within said apparatus to suspend previously precipitated salts and impurities, and flushing out suspended matter from the container without removing the loose finely divided filter bed.

9. The method of sterilizing and purifying drinking water in small batches comprising disposing the batch of water to be sterilized and purified in a sterilizing container having therein a loose finely divided filter bed, applying heat to the batch of water at an elevation preferably below the lowest point of the filter bed to sterilize the entire batch of water, the purifying material, the entire filter bed and all apparatus surfaces with which said water may contact, introducing adsorbing material into the batch of water in the container and manually agitating the container and water at any time following the introduction of the water into the container to cause dispersion of said material throughout the batch of water, filtering the sterilized and treated water through said sterile filter bed as it leaves the sterilizing container to remove insoluble adsorbing material and attached impurities, adding a batch of water for washing purposes, agitating said filter bed and wash water by shaking the apparatus and contents to scour surfaces coated with precipitated salts and other impurities and to suspend previously deposited solid adsorbing material and impurities, and decanting the batch of wash water with suspended matter from the container without removing the loose finely divided filter bed.

10. The method of sterilizing and purifying drinking water in small batches comprising disposing the batch of water to be sterilized and purified in a sterilizing container having therein a loose finely divided filter bed, applying heat to the batch of water directly beneath said filter bed to sterilize the entire batch of water, the purifying material, the entire filter bed and all apparatus surfaces with which said water may contact, introducing adsorbing and coagulum forming material, dispersing the material into the batch of water of the container at any time following the time said water reaches the boiling point to thereby aid filtration in the removal of objectionable taste and turbidity caused by the heating operation, filtering the sterilized and treated water through said sterile filter bed as the water leaves the sterilizing container to remove the adsorbing and coagulum forming material and attached impurities, adding a batch of water for washing purposes, agitating said filter bed and wash water by shaking the apparatus and contents to suspend previously deposited impurities and solid adsorbing material, and decanting the batch of wash water with suspended matter from the container without removing the loose finely divided filter bed.

11. The method of sterilizing and purifying drinking water in small batches comprising disposing the batch of water to be sterilized and purified into a sterilizing container having therein a loose finely divided filter bed, applying heat to the batch of water by causing it to be transmitted through the filter bed as hot water and steam to sterilize the entire batch of water, the purifying material, the entire filter bed and all apparatus surfaces with which said water may contact, introducing into the batch of boiling water in said container two or more soluble reacting chemicals which form a purifying and adsorbing coagulum to cause the formation and dispersion of a purifying coagulum, filtering the sterilized and treated water through said sterile filter bed as it leaves the sterilizing container to remove the precipitate caused by boiling and to provide a clear, tasteless, odorless, sterile water, adding a batch of water for washing purposes, agitating said filter bed and wash water by shaking the apparatus and contents to scour surfaces coated with precipitated salts and other impurities and to suspend previously deposited solid adsorbing material and impurities, and decanting the batch of wash water with suspended matter from the container without removing the loose finely divided filter bed.

12. The method of sterilizing and purifying water in batches, in which the water is introduced into a container having a filter and is brought to a boiling temperature to thereby simultaneously effect sterilization of the water, the filter bed and all surfaces of the container with which the water comes in contact, and thereafter the water is filtered through said sterile filter bed to effect removal of precipitated matter and solid impurities.

13. The method of sterilizing and purifying water in batches, in which a coagulum-forming material is introduced into the water and is dispersed throughout the batch of water by boiling of the water in contact with a filter in a container, and thereafter the coagulum, precipitated salts and solid impurities are removed by filtering the water through the sterile filter.

14. The method of sterilizing and purifying water, in batches in which a coagulum-forming material is introduced into the water while the latter is boiling in contact with a filter bed to effect thorough dispersion of the material and also sterilization of the same and at the same time allow precipitation of salts or impurities by reason of the boiling action prior to the formation of coagulum in the water, and the water is thereafter filtered through the sterile filter bed.

ORRIN E. ANDRUS.